United States Patent
Tao et al.

(10) Patent No.: US 6,299,844 B1
(45) Date of Patent: Oct. 9, 2001

(54) PHOTOCHEMICAL REACTOR

(75) Inventors: Hiroaki Tao; Tetsuya Nakazato, both of Tsukuba (JP)

(73) Assignee: Agency of Industrial Science and Technology (JP)

( * ) Notice: Subject to any disclaimer, the term of this patent is extended or adjusted under 35 U.S.C. 154(b) by 0 days.

(21) Appl. No.: 09/534,620

(22) Filed: Mar. 27, 2000

(30) Foreign Application Priority Data

Jun. 2, 1999 (JP) ................................................. 11-154700

(51) Int. Cl.⁷ ............................... B01J 19/08; B01J 19/12
(52) U.S. Cl. ........................ 422/186; 422/186.3; 210/748
(58) Field of Search ................................. 422/186.3, 186; 210/748

(56) References Cited

U.S. PATENT DOCUMENTS 3,790,801 * 2/1974 Coleman ............................... 250/453
4,456,512 * 6/1984 Bieler et al. ......................... 422/186.3
5,205,913 * 4/1993 Grossman et al. ............... 204/157.22

FOREIGN PATENT DOCUMENTS

| 281 545 A | 8/1990 | (DE) . |
| 195 00 802 A | 12/1995 | (DE) . |
| 195 00 803 A | 12/1995 | (DE) . |

* cited by examiner

*Primary Examiner*—Kathryn Gorgos
*Assistant Examiner*—Thao Tran
(74) *Attorney, Agent, or Firm*—Lorusso & Loud

(57) ABSTRACT

A photochemical reactor including a lamp for producing light when supplied with electric current; and a transparent pipe secured to and extending through the lamp and having both ends protruding from the lamp so that a reactant feed can be fed from one end of the pipe, irradiated with light from the lamp and discharged from the other end of the pipe.

6 Claims, 1 Drawing Sheet

PHOTOCHEMICAL REACTOR

BACKGROUND OF THE INVENTION

This invention relates to a photochemical reactor for carrying out a photoreaction. More specifically, the present invention is directed to a photochemical reactor adapted for irradiating a reactant feed with actinic light and for performing a photoreaction such as photosynthesis, photodecomposition, photoreduction, photooxidation, photocatalytic reaction, photosterilization, photocleaning, photoheating, photodeodorization or photocuring.

A typical known reaction apparatus for carrying out a photoreaction includes a tubular linear reactor and a tubular linear lamp disposed in parallel with and adjacent to the reactor. Also known is an apparatus having a tubular linear lamp and a helical tubular reactor wound around the lamp. Further, an apparatus having a tubular linear lamp inserted into a central hole of a cylindrical reactor is known. An apparatus is further known in which light from a linear tubular lamp is reflected on a reflector and is redirected to a reactor. These known photochemical reactors have the following problems.

With the apparatus in which a linear tubular reactor and a linear tubular lamp are juxtaposed in parallel, only a part of the light from the lamp is irradiated on the reactor.

The light irradiation efficiency is improved when the reactor is helical and wound around the linear tubular lamp. However, the improvement is not so significant. Moreover, the helical reactor is apt to be broken upon collision with a hard thing.

In the case of the apparatus having a tubular linear lamp coaxially disposed in a cylindrical reactor, the size of the reactor is unavoidably large. With such an apparatus, therefore, it is impossible to effectively perform photoreaction of a small amount of reactant.

Furthermore, the above-described conventional photochemical reactor apparatuses have a problem that, when a jacket is mounted around the lamp for cooling the lamp with a cooling medium fed to the jacket, the light from the lamp is partly absorbed by the jacket and the cooling medium before arriving at the reactor. Additionally, when the photochemical reaction is carried out with the use of vacuum ultraviolet rays, the conventional apparatuses must be disposed in a vacuum chamber or in an oxygen-free chamber.

SUMMARY OF THE INVENTION

It is, therefore, an object of the present invention to provide a photochemical reactor which can irradiate a reactant with light with a high efficiency.

Another object of the present invention is to provide an easy to handle photochemical reactor which is simple and compact and which is fabricated without need of high costs.

It is a further object of the present invention to provide a photochemical reactor which permits cooling of a lamp without reducing the irradiation efficiency.

It is yet a further object of the present invention to provide a photochemical reactor which is not required to be disposed in a vacuum chamber or in an oxygen-free chamber even when vacuum ultraviolet rays are to be used for the intended photochemical reaction.

In accomplishing the foregoing objects, there is provided in accordance with the present invention a photochemical reactor which comprises a discharge lamp for producing light when supplied with electric current, and a transparent pipe secured to and extending within and through said lamp, said pipe having both ends protruding from said lamp so that a reactant feed can be fed from one end of said pipe, irradiated with light from said lamp and discharged from the other end of said pipe.

In another aspect, the present invention provides a photochemical reactor comprising:
 a tubular discharge lamp for producing UV light when supplied with electric current, said discharge lamp having a tubular transparent shell in which a discharge gas is confined;
 a tubular transparent pipe secured to and extending within and through said shell and having both ends protruding from both longitudinal ends of said shell,
 a reflector surrounding said shell so that light from said lamp is reflected thereon and is irradiated on said pipe, and
 a tubular transparent reaction tube detachably fitted in said pipe so that a reactant feed can be fed from one end of said reaction tube, irradiated with UV light from said lamp and discharged from the other end of said reaction tube.

The photochemical reactor according to the present invention is useful for carrying out a photoreaction such as photosynthesis, photodecomposition, photoreduction, photooxidation, photocatalytic reaction, photosterilization, photocleaning, photoheating, photodeodorization or photocuring.

BRIEF DESCRIPTION OF THE DRAWINGS

Other objects, features and advantages of the present invention will become apparent from the detailed description of the preferred embodiments of the invention which follows, when considered in light of the accompanying drawings, in which.

DETAILED DESCRIPTION OF THE PREFERRED EMBODIMENTS OF THE INVENTION

Figure 1:
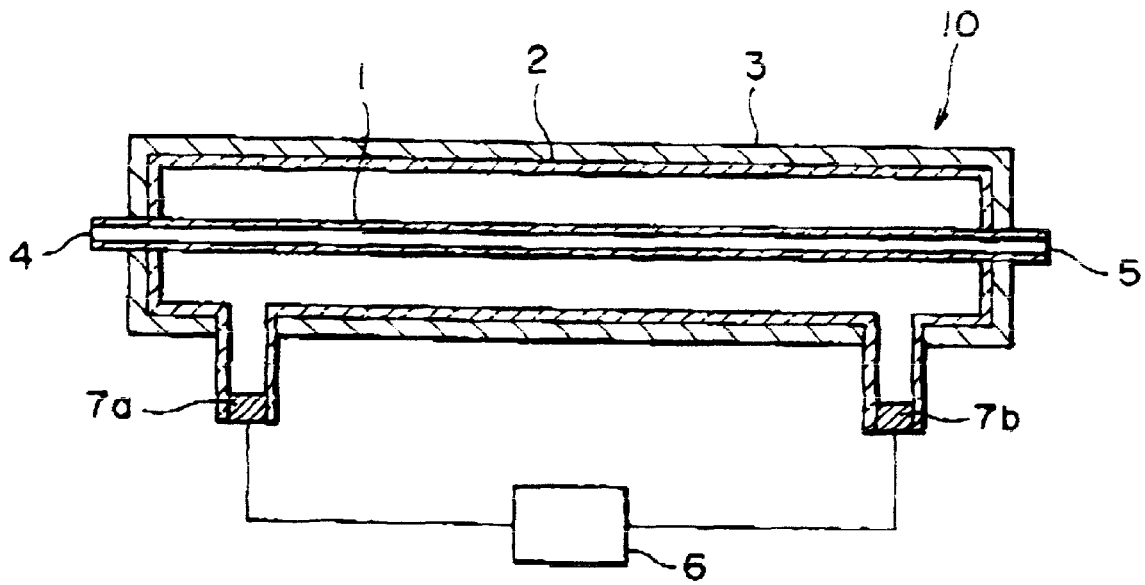
FIG. 1 is a cross-sectional elevational view diagrammatically illustrating an embodiment of a photochemical reactor according to the present invention.

Referring now to FIG. 1, a photochemical reactor according to one embodiment of the present invention has a lamp designated generally as 10 for producing light when supplied with electric current. The lamp 10 may be of a well-known type such as a mercury vapor lamp for producing UV light. Depending upon the particular reaction being carried out, either monochromatic, such as an argon ion laser, or polychromatic light, such as a high pressure mercury vapor lamp, may be employed.

In the illustrated embodiment, the lamp 10 is a discharge lamp having a tubular transparent, air-tight shell 2 in which a discharge gas such as mercury is confined. Designated as 7a and 7b are a pair of cathode and anode electrodes which are electrically connected to a terminal member 6. Thus, when the terminal 6 is connected to a power source, electric current is supplied to the lamp 10 to emit UV light.

A tubular transparent pipe 1 is secured to and disposed within the shell 2. In order to prevent the discharge gas from escaping from the shell 2, the pipe 1 and the shell 2 are preferably fuse-bonded to each other. The pipe 1 has both open ends 4 and 5 protruding from both longitudinal ends of the shell 2. The pipe 1 in this embodiment is linear but may be of any desired shape.

As a result of the above construction, when a raw material feed to be subjected to a photoreaction is fed from one of the ends 4 and 5 of the pipe 1 and is passed through the pipe 1, the photoreaction occurs. By introducing the reactant feed continuously into the pipe 1 while discharging the product therefrom, the photoreaction can be carried out continuously. Any material may be used for the formation of the pipe 2, as long as it is transparent to particular light with which desired photoreaction is performed. The pipe 1 is generally made of a synthetic quartz glass.

In the illustrated embodiment, the pipe 1 serves to function as a reactor tube. Since it is not easy to wash the inside wall of the pipe 1, a second embodiment shown in FIG. 2 uses a tubular transparent reaction tube 11 detachably fitted in the pipe 1. In this case, the pipe 1 serves to act as a light emitting cell. By introducing a reactant feed from one end 12 of the reaction tube 11 inserted into the pipe 1, UV light may be irradiated on the reactant feed. The reaction product may be discharged from the other end (not shown) of the reaction tube 11 protruded from the end opening 5 of the pipe 1.

In the above-described second embodiment, the reaction tube 11 is easily detached from the reactor and can be easily washed using any desired cleaning agent. Since the inside wall of the pipe 11 is not fouled with reactants, mere cleaning with a soft paper or cloth is sufficient to keep the pipe 11 clean.

Referring again to FIG. 1, designated as 3 is a reflector surrounding the shell 2 of the lamp 10 so that light from the lamp 10 is reflected thereon and is irradiated on the pipe 1. The reflector 3 may be a metal layer formed by vacuum deposition of the metal on an outer surface of the shell 2. The metal may be, for example, aluminum and is suitably selected according to the particular light used for the desired photochemical reaction. Instead of vacuum deposition, a metal foil may be used to surround an outer surface of the shell 2 to form the reflector 3. Alternatively, a metal cylinder having a mirror interior surface may be mounted to cover the shell 2 for use as the reflector 3.

Referring again to FIG. 2, designated as 20 is a jacket surrounding the lamp for cooling the lamp with a cooling medium, such as water or a gas, introduced into a space between the jacket 20 and the lamp. Thus, by feeding the cooling medium into the space between the jacket 20 and the shell 2 of the lamp 10, the lamp may be cooled. This makes possible to control the reaction temperature in the reaction tube 11. Additionally, the service life of the lamp 10 may be improved. Designated as 21 is a discharge port for the cooling medium.

Figure 2:
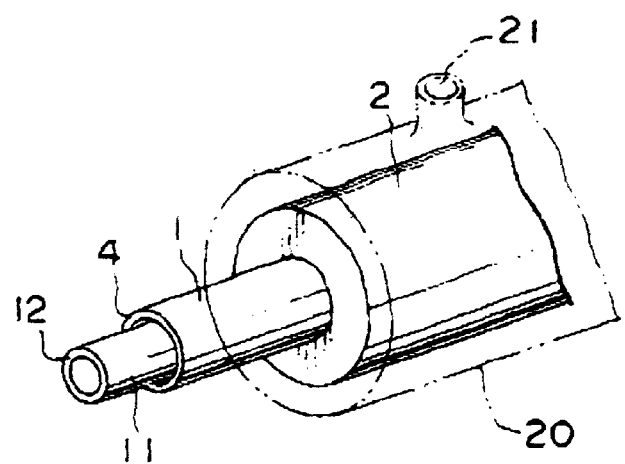
FIG. 2 is a fragmentary perspective view illustrating another embodiment of a photochemical reactor according to the present invention.

In the embodiment illustrated in FIG. 2, a reflector 3 is not used. However, it is without saying that a reflector 3 as described above can be provided on the shell 2. Rather, it is desirable that the shell 2 be covered with a reflector 3, because not only the irradiation efficiency is improved but also a higher cooling efficiency is obtained because of a greater heat conductivity of the reflector.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

The teachings of Japanese Patent Application No. H11-154700, filed Jun. 2, 1999 and entitled "Photochemical Reactor Having Built-In-Type Photoreaction Tube", inclusive of the specification, claims and drawings, are hereby incorporated by reference herein.

What is claimed is:

1. A photochemical reactor comprising:

a lamp, mounted within a lamp housing having an open interior, for producing light when supplied with electric current to illuminate the lamp housing, a transparent pipe secured to and extending within and through said lamp housing, said pipe having both ends protruding from said lamp housing; and a transparent reaction tube detachably fitted in and extending through said pipe so that the reactant feed can be fed from one end of said reaction tube, irradiated with light from said lamp and discharged from the other end of said reaction tube.

2. A photochemical reactor as recited in claim 1, further comprising a reflector surrounding said lamp housing so that light from said lamp is reflected thereon and is irradiated on said pipe.

3. A photochemical reactor as recited in claim 1, further comprising a jacket surrounding said lamp housing for cooling said lamp with a cooling medium introduced into a space between said jacket and said lamp.

4. A photochemical reactor as recited in claim 2, further comprising a jacket surrounding said reflector for cooling said lamp with a cooling medium introduced into a space between said jacket and said reflector.

5. A photochemical reactor comprising:

a tubular discharge lamp for producing UV light when supplied with electric current, said discharge lamp having a tubular transparent shell in which a discharge gas is confined;

a tubular transparent pipe secured to and extending within and through said shell and having both ends protruding from respective longitudinal ends of said shell, a reflector surrounding said shell so that light from said lamp is reflected thereon and is irradiated on said pipe, and a tubular transparent reaction tube detachably fitted in and extending through said pipe so that a reactant feed can be fed from one end of said reaction tube, irradiated with UV light from said lamp and discharged from the other end of said reaction tube.

6. A photochemical reactor as set forth in claim 5, further comprising a jacket surrounding said reflector for cooling said shell with a cooling medium introduced into a space between said jacket and said reflector.

* * * * *